United States Patent Office 2,748,620
Patented June 5, 1956

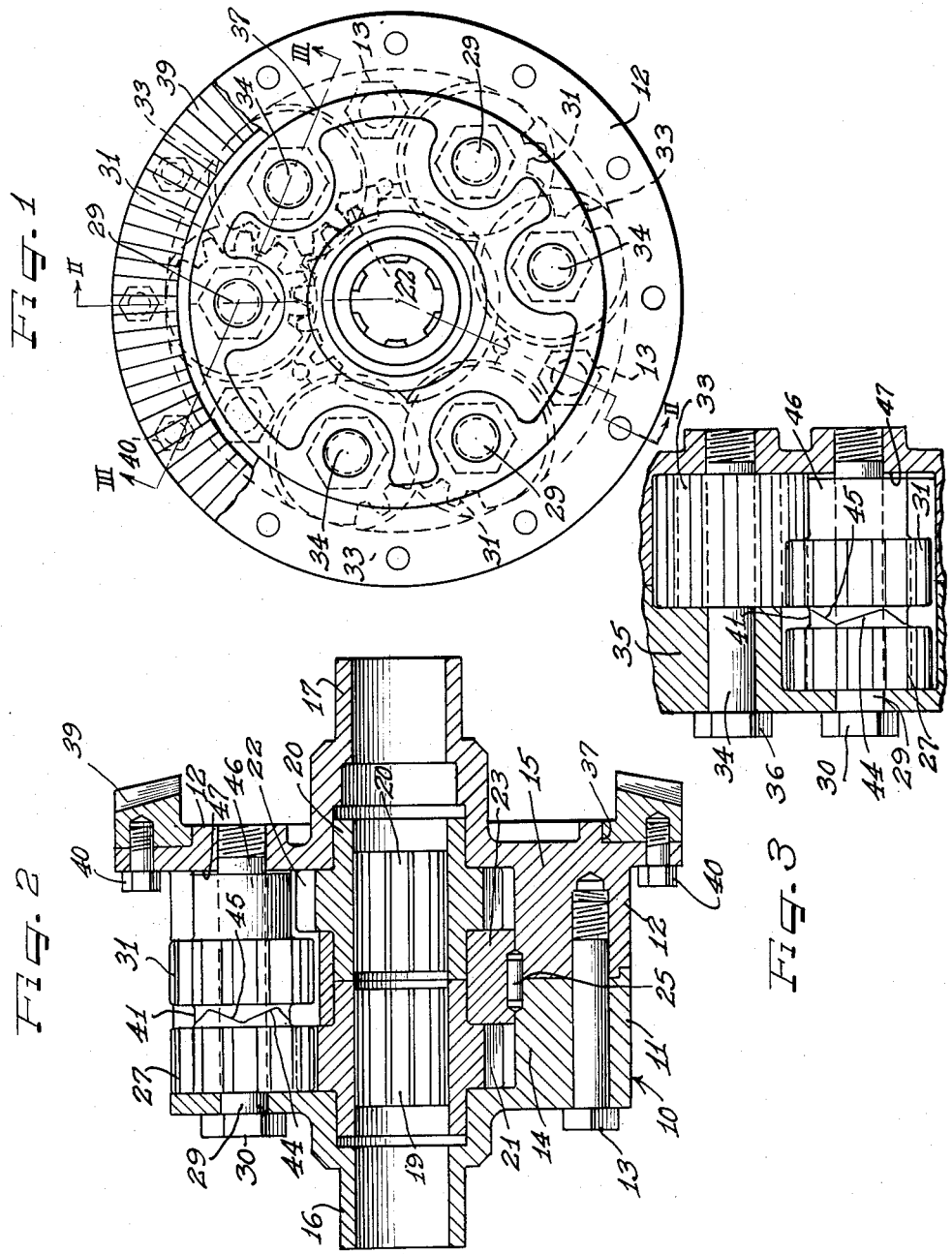

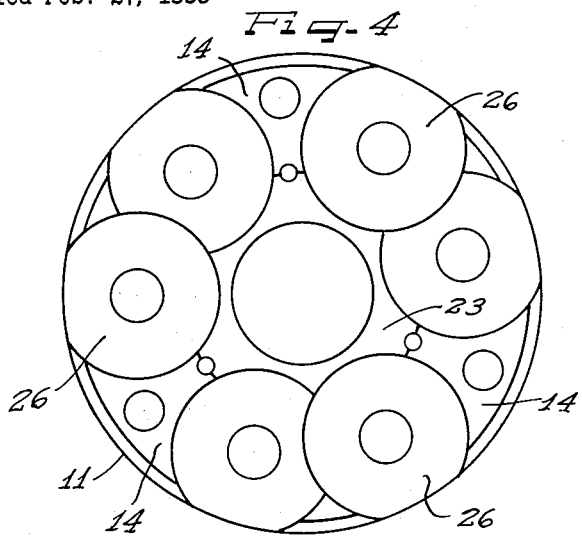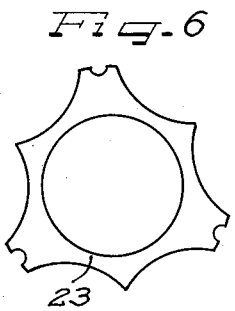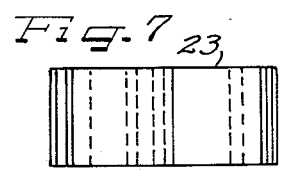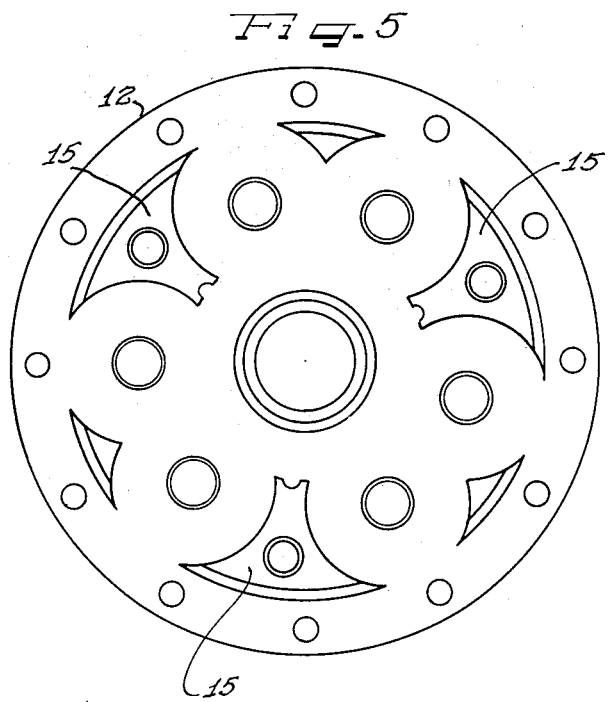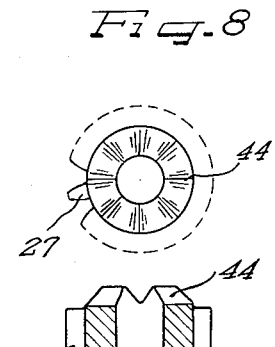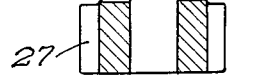
INVENTOR.
OTTO R. SCHOENROCK
ATTYS.

2,748,620

DIFFERENTIAL

Otto R. Schoenrock, Oak Park, Ill.

Application February 27, 1953, Serial No. 339,292

3 Claims. (Cl. 74—711)

This invention relates to improvements in differentials and more particularly relates to an improved form of torque proportioning differential.

With the conventional differential used on automotive vehicles, the torque is equally divided between the two wheels. Therefore, if the tractive effort which can be developed by the two wheels is unequal, the total tractive effort available for vehicle propulsion will be twice that available at the wheel having the least traction.

Thus in extreme cases where one wheel rests on ice and the other rests on dry pavement, a relatively low wheel torque will cause the wheel on ice to spin. This same low wheel torque will be all that is available at the wheel on dry pavement, and usually the vehicle will stall. Another disadvantage in the conventional differential is that if one wheel hits a bump hard enough to leave the road it will accelerate, and when it again contacts the road tire scuffing will result.

The use of wheel brakes to distribute the torque between two wheels, locking differentials and torque bias differentials of various types have been used to automatically supply the wheel on dry pavement with more torque than the wheel having low traction, to minimize spinning of the wheels and stalling of the vehicle. The use of the brakes, to divide the power and prevent stalling, causes wear on the brakes and requires an excessive amount of power and is only satisfactory to prevent stalling when a highly skilled operator is operating the vehicle. The various forms of torque bias differentials also have not been entirely satisfactory, since they have been complicated with numerous small parts forming a source of trouble, and due to the size and complication of these differentials they have only been suitable for use on trucks.

My invention has its principal objects to remedy the foregoing deficiencies by providing a simple and compact form of torque proportioning differential suitable for universal use on various forms of automotive vehicles.

Still another object of my invention is to provide a torque proportioning differential of a novel and simplified construction increasing the torque on the wheel having the higher tractive effort on the ground, when the tractive effort of the other wheel is low.

Still another object of my invention is to provide a spur gear type of torque proportioning differential arranged with a view toward utmost simplicity compactness and efficiency in construction and operation.

Still another object of my invention is to provide a simplified form of torque proportioning differential in which the differential pinions are coupled to rotate together and in which one differential pinion moves axially relative to the other and resists the tendency of the pinions to rotate about the axle gear for the wheel having high tractive effort and increases the torque to the wheel having the better traction conditions where the traction conditions for the two wheels are unequal.

Still another object of my invention is to provide a new and improved form of differential of the spur gear type in which the orbitally movable differential pinions are rotatably connected together by inclined sliding jaws, moving one pinion relative to the other along the axis thereof into engagement with the differential casing, where the torque loads on the two wheels may be unequal, and proportioning the load to apply the greater torque to the wheel having high traction.

These and other objects of my invention will appear from time to time as the following specification proceeds and with reference to the accompanying drawings wherein:

Figure 1 is an end view of a differential constructed in accordance with my invention with the drive gear therefor broken away;

Figure 2 is a sectional view taken substantially along line II—II of Figure 1;

Figure 3 is a fragmentary sectional view taken substantially along line III—III of Figure 1;

Figure 4 is an inner end view of one casing part of the differential;

Figure 5 is an inner end view of the other casing part of the differential;

Figure 6 is an end view of the differential spider;

Figure 7 is a plan view of the spider shown in Figure 6 looking upwardly toward the bottom thereof;

Figure 8 is an end view of one of the differential pinions looking toward the jaws of the coupling thereof; and Figure 9 is a sectional view taken through the differential pinion shown in Figure 8.

In the embodiment of my invention illustrated in the drawings, I have shown a differential of the spur gear type comprising a casing 10 made up of two abutting casing parts 11 and 12, secured together as by self-locking cap screws 13, extending through abutting bosses 14 and 15 of the respective casing parts 11 and 12.

The casing parts 11 and 12 are shown as having hubs 16 and 17, respectively, which may be journalled for rotation about the axles for the vehicle (not shown), for rotatably driving the rear wheels of the car. The axles may have splined engagement with internally splined hubs 19 and 20 of spur axle drive gears 21 and 22 respectively journalled on their hubs within the casing parts 11 and 12 within the hubs 16 and 17 thereof, and within a spider member 23.

The spider member 23 is shown as being spaced between the axle drive gears 21 and 22 and as being keyed to the bosses, or projections 14 and 15 of the casing portions 11 and 12 as by keying pins 25, 25. The spider member 23 may be a bearing member or may have a bearing carried thereby so as to form a bearing for the casing 10 on the inwardly extending hubs 19 and 20 of the respective axle drive gears 21 and 22.

The casing part 11 is shown as having three equally spaced generally circular recesses 26 therein, opening toward the axle drive gear 21 within which are rotatably journalled differential pinions 27. The differential pinions 27, are herein shown as meshing with the axle drive gear 21 and as being rotatably journalled on transverse shafts 29. Each transverse shaft 29 has a head 30 abutting the outside of the casing part 11 and is threaded at its inner end within the casing part 12. Each shaft 29 also has a differential pinion 31, rotatably journalled thereon for rotation with the pinion 27 and meshing with and driving a differential pinion 33 mounted on a parallel shaft 34. The pinion 33 has relatively wide faced teeth, as may be seen with reference to Figure 3, half of the faces of which mesh with the differential pinion 31, and the other half of the faces of which mesh with and drive the axle gear 22.

Each differential pinion 33 is shown as abutting a boss 35 extending inwardly from the casing part 11 and as having the shaft 34 extending therethrough. The shaft 34 like the shaft 29 is threaded within the casing part 12 at one of its ends and has a head 36 at its opposite end, abutting the outer side of the casing part 11.

The casing part 12 is shown as extending radially beyond the periphery of the casing part 11 and as having an annular recess 37 extending therearound, within which fits a ring gear 39. The ring gear 39 may be a bevel or spiral gear of a well known form and is shown as being secured to the annular recess 37 of the casing part 12 as by cap screws 40, 40 threaded in said ring gear from the inner side of the flange having the annular recess 37 formed therein.

Assuming the differential pinions 31 are rotating with the differential pinions 27 and the ring gear 39 is rotatably driving the casing 10, and assuming the torque on each axle to be equal, the differential pinions 27, 31 and 33, and the axle drive gears 21 and 22 will normally rotate with the casing 10 as a unit, the speed of rotation of said axle drive gears being the same as the speed of rotation of said pinions 27 and 31. Assuming further that the differential pinions are connected together to rotate as a unit and that one wheel rests on ice, since the torque between the two wheels is equally divided, the tractive effort developed by the other wheel will be substantially the same as that developed by the wheel resting on ice, and the wheel resting on ice will spin.

Referring now to the novel means of my invention for proportioning and dividing the torque unequally between the two wheels when conditions occur that make this necessary, so that the torque to the wheel resting on ice will be relatively low and the torque to the wheel resting on dry pavement will be relatively high, the intermediate differential pinion 31 is shown as being axially movable along the shaft 30 and as being connected with the differential pinion 27 for rotation therewith, by a sliding jaw clutch 41. The jaw clutch 41 is shown as having relatively flat angled V-shaped meshing teeth 44 and 45 formed integrally with and extending inwardly from the respective differential pinions 27 and 31. The angles of the faces of the teeth 44 and 45 are such that the pinions 27 and 31 will rotate together when the torque loads on each axle are equal. When, however, the torque loads become unequal, the unequal torques on the two pinions force one to axially move with respect to the other into engagement with the differential casing.

As shown in Figure 2 of the drawings the pinion 31 is free from the differential casing when the torque loads are equal and axially moves along the shaft 29 when the torque loads are unequal. When this pinion is forced away from the pinion 27 along the shaft 29 by the unequal torque loads, a hub 46 thereof will come into engagement with the inner face 47 of the casing part 12. This will tend to lock the two pinions 27 and 31 to the casing 10 to rotate therewith as a unit, and provide in effect a substantially direct drive to the two axle gears 21 and 22.

The angles of the jaws 44 and 49, however, are of sufficient pitch so the pressure exerted against the casing part 12 will be insufficient to lock the two axles to rotate together as a unit, but will be sufficient to distribute the load to the axle on the dry pavement and supply a greater part of the driving torque to this axle, supplying a proportionately decreased driving torque to the axle on the icy pavement, with the result that the wheel on the dry pavement may propel the vehicle.

While the faces of the clutch teeth 44 and 45 may be inclined at various angles, it has been found that face angles of from 15° to 25° are most efficient to provide the desired results. It has further been found that with a face angle of the clutch teeth of approximately 20°, where one wheel has very little traction and the other wheel is on dry pavement, that the torque distribution will approach 75% to the axle driving the wheel on dry pavement and 25% to the axle driving the wheel having little traction.

It should further be understood that when once the car is started and the two wheels are on smooth dry pavement and the car is traveling in a straight line, that the pinions 31 and 27 will come into balance, since the torque load on each pinion is now the same. The differential will then function as a normal differential.

It may be seen from the foregoing that I have provided an extremely simple and effective means for proportioning the torque between the axles for the two driving wheels of a motor vehicle, so that the wheel on dry pavement will always be supplied with a greater proportion of the torque than the wheel on a slippery pavement, which torque will be sufficient to prevent the vehicle from stalling and to start the vehicle.

It may further be seen that this is attained by simply connecting the aligned pinions of a spur gear type differential together by inclined clutch jaws, rotatably driving one from the other, but having a tendency to force the two pinions apart, where the torque loads on the two wheels may be unequal, to provide a substantially solid drive connection to the two wheels, and eliminate the spinning of the wheel on slippery pavement.

It will be understood that modifications and variations may be effected in this invention without departing from the scope of the novel concepts thereof.

I claim as my invention:

1. In a differential of the torque proportioning type, a casing journalled for rotation about a fixed axis, means rotatably driving said casing, two aligned axle drive gears journalled coaxial with the axis of rotation of said casing for independent rotation with respect to each other, a plurality of circumferentially spaced differential pinions freely journalled within said casing in radially spaced relation with respect to the axis of rotation thereof and meshing with one of said axle drive gears, a plurality of differential pinions aligned with said first mentioned differential pinions and rotatably driven thereby, a plurality of differential pinions driven by said last mentioned differential pinions and meshing with the other of said axle drive gears, said casing having opposite abutment faces facing each set of aligned differential pinions and jaw clutch means connecting the aligned of said differential pinions to rotate together, said jaw clutch means having engaging inclined clutch teeth, the faces of which are inclined at such angles as to form cams to axially move said aligned pinions with respect to each other into engagement with said abutment faces of said casing, when the torque on one axle gear is different from that on the other, and to increase the torque to the axle drive gear operating under high torque resistance.

2. In a differential of the torque proportioning type, a casing journalled for rotation about a fixed axis, means rotatably driving said casing, two aligned axle drive gears journalled coaxial with the axis of rotation of said casing for independent rotation with respect to each other, a plurality of circumferentially spaced differential pinions freely journalled within said casing in radially spaced relation with respect to the axis of rotation thereof and meshing with one of said axle drive gears, a plurality of differential pinions aligned with said first mentioned differential pinions and rotatably driven thereby, said casing having opposite abutment faces facing each set of aligned differential pinions, a plurality of differential pinions driven by said last mentioned differential pinions and meshing with the other of said axle drive gears, and jaw clutch means connecting the aligned of said differential pinions to rotate together, said jaw clutch means having facing engaging relatively flat angled V-shaped teeth, for driving one of said first mentioned aligned differential pinions from the other and forming cams forcing said pinions to axially move with respect to each other into engagement with said abutment faces of said casing, when the torque on said axle gears becomes unbalanced, and increasing the torque on one axle gear when the torque on the other axle gear is low.

3. In a differential of the torque proportioning type, a casing journalled for rotation about a fixed axis and having two abutting casing parts, a ring gear secured to one of said casing parts for driving said casing, two axially aligned axle drive gears within said casing and journalled for independent rotation about an axis coaxial with the axis of rotation of said casing, a plurality of shafts spaced radially from said axle drive gears for securing the parts of said casing together, pinions on certain of said shafts meshing with one of said axle drive gears, pinions on certain other of said shafts and meshing with the other of said axle drive gears, other pinions coaxial with said first mentioned pinions meshing with said second mentioned pinions, jaw clutch means connecting said coaxial pinions to rotate together, said jaw clutch means having facing engaging relatively flat angled V-shaped teeth, said casing parts having abuttment faces facing each set of coaxial pinions, and said V-shaped clutch teeth driving said coaxial pinions to rotate together when the torque loads are equal and forcing said coaxial pinions to move axially away from each other into engagement with said abutment faces when the torque loads on said axle gears become unbalanced, and increasing the torque on one axle gear when the torque on the other axle gear is low.

References Cited in the file of this patent
UNITED STATES PATENTS

| | | |
|---|---|---|
| 1,556,101 | Goodhart | Oct. 6, 1925 |
| 1,586,861 | Taylor | June 1, 1926 |
| 1,938,649 | Welsh | Dec. 12, 1933 |
| 2,113,515 | Montgrand | Apr. 5, 1938 |
| 2,479,638 | Randall | Aug. 23, 1949 |
| 2,481,873 | Randall | Sept. 13, 1949 |